(12) United States Patent
Kirkham et al.

(10) Patent No.: US 7,017,969 B1
(45) Date of Patent: Mar. 28, 2006

(54) INTERIOR SHIELD ON THE LID OF THE TRUNK OF A VEHICLE TO PREVENT THE LID OF THE TRUNK FROM BEING DAMAGED BY THE CONTENTS CONTAINED BENEATH THE LID

(76) Inventors: Kevin Kirkham, 756 N. Alfred St., Los Angeles, CA (US) 90069; James McCarthy, 2038 Walnut Ave., Venice, CA (US) 90291; Ronald Walsh, 12806 Pacific Ave., No. 7, Venice, CA (US) 90066

( * ) Notice: Subject to any disclaimer, the term of this patent is extended or adjusted under 35 U.S.C. 154(b) by 369 days.

(21) Appl. No.: 10/209,270

(22) Filed: Jul. 30, 2002

Related U.S. Application Data

(60) Provisional application No. 60/310,008, filed on Aug. 1, 2001.

(51) Int. Cl.
*B60R 13/01* (2006.01)

(52) U.S. Cl. .......................... 296/39.1; 296/76
(58) Field of Classification Search ............... 296/37.1, 296/39.1, 39.3, 76
See application file for complete search history.

(56) References Cited

U.S. PATENT DOCUMENTS

| | | | |
|---|---|---|---|
| 2,898,146 A | 8/1959 | Yudenfreund | |
| 3,653,710 A | 4/1972 | Barnard | |
| 4,288,490 A | 9/1981 | Alfter et al. | |
| 5,419,602 A | 5/1995 | VanHoose | |
| 5,531,499 A * | 7/1996 | Vecchio et al. ............ | 296/39.1 |
| 5,626,380 A | 5/1997 | Elson et al. | |
| 5,722,710 A | 3/1998 | Faiciani | |
| 6,120,078 A | 9/2000 | Smyl | |
| 6,561,562 B1 * | 5/2003 | Hesch ........................ | 296/39.3 |

FOREIGN PATENT DOCUMENTS

| | | | | |
|---|---|---|---|---|
| DE | 3301682 | * | 7/1984 | ................. 296/39.3 |
| DE | 4019121 | * | 1/1991 | ................. 296/76 |
| JP | 0014777 | * | 1/1991 | ................. 296/39.3 |
| JP | 14777 | * | 1/1991 | ................. 296/39.3 |
| WO | WO 89/09155 | | 10/1989 | |
| WO | WO 00/21794 | | 4/2000 | |

OTHER PUBLICATIONS

PelicanParts website, Boxster Protective Liner, 2 Pages with Google search notes, 2 pages, prior to May 2002.*
SR Motorsports website, Hot Stuff from 2001, 4 pages with Google search notes, 1 pages. Nov. 19, 2001.*
Immautospecialties Website, 1982-1987 Grand National and Turbo T, 3 pages., copyright 2001.*
MZ3.Net, "M roadster Trunk Organizer", Feb. 27, 1999.*
MZ3.Net, BMW Trunk Organizer, 5 pages, Nov. 29, 1997.*
J.C. Whitney & Co., Catalog 559C, p. 19, "Nylon Panel Fastener". Feb. 1997.*

* cited by examiner

*Primary Examiner*—Dennis H. Pedder
(74) *Attorney, Agent, or Firm*—Thomas I. Rozsa; Tony D. Chen

(57) ABSTRACT

An interior shield that is located immediately beneath the lid of the storage compartment of a vehicle to prevent interior objects from damaging the lid. The storage compartment can be in the front of the vehicle or in the rear of the vehicle. The shield is made of strong lightweight material such as ABS plastic which can be removably attached to fit over the interior of the lid of the storage compartment by attaching means such as plastic clips.

24 Claims, 3 Drawing Sheets

INTERIOR SHIELD ON THE LID OF THE TRUNK OF A VEHICLE TO PREVENT THE LID OF THE TRUNK FROM BEING DAMAGED BY THE CONTENTS CONTAINED BENEATH THE LID

This appln. claims benefit of 60/310,008, filed Aug. 1, 2001.

BACKGROUND OF THE INVENTION

1. Field of the Invention

The present invention relates to the field of automobiles and more particularly, to the area of an automobile which contains objects such as the trunk or in the case of cars with rear or mid engines, the front. In particular, the present invention relates to the field of shields which protect the body of the automobile and in particular the lid of the trunk of the automobile from being damaged by the contents of the trunk which is used to carry objects.

2. Description of the Prior Art

In general, the concept of providing a shield to protect certain portions of an automobile have in general been known in the prior art. However, it is believed that none of the prior art inventions incorporate a concept of trying to protect the trunk of a vehicle and in particular, a Porsche, from being damaged by the contents contained within the vehicle.

The following nine (9) prior art references are found to be pertinent to the field of the present invention:

1. U.S. Pat. No. 2,898,146 issued to Yudenfreund on Aug. 4, 1959 for "Foldable Insert And Liner For The Rear Of Station Wagons" (hereafter the "Yudenfreund Patent");

2. U.S. Pat. No. 3,653,710 issued to Barnard on Apr. 4, 1972 for "Storage Compartment Liner With Inflatable Support Ribs" (hereafter the "Barnard Patent");

3. U.S. Pat. No. 4,288,490 issued to Alfter et al. on Sep. 8, 1981 for "Engine Hood Lining For Automotive Vehicles" (hereafter the "Alfter Patent");

4. U.S. Pat. No. 5,626,380 issued to Elson et al. on May 6, 1997 for "Storage Device For Vehicle Luggage Compartment" (hereafter the "Elson Patent");

5. U.S. Pat. No. 5,722,710 issued to Faiciani on Mar. 3, 1998 for "Expandable Protective Liner For Vehicles" (hereafter the "Faiciani Patent");

6. U.S. Pat. No. 5,419,602 issued to VanHoose on May 30, 1995 for "Apparatus For Protecting Vehicle Cargo Area" (hereafter the "VanHoose Patent");

7. U.S. Pat. No. 6,120,078 issued to Smyl on Sep. 19, 2000 for "Protective Liner Insert For Vehicle Cargo Compartment" (hereafter the "Smyl Patent");

8. PCT No. WO 89/09155 for "Automotive Trunk Liner" (hereafter "the '155 PCT Patent"); and 9. PCT No. WO 00/21794 for "Vehicle Cargo Compartment Liner" (hereafter "the '794 PCT Patent").

The Yudenfreund Patent discloses a foldable insert and liner for the rear of station wagons. It comprises a floor and a plurality of walls which extend upwardly from the floor.

The Barnard Patent discloses a storage compartment liner with inflatable support ribs. The sidewalls include inflatable tube-like compartments so that when the tube-like compartments are inflated, they provide standup rigidity in the sidewalls. The liner is flexible to deform when twisted and wiggled so that it can be easily repositioned while in the storage compartment and can be pulled out of the compartment and emptied while the ribs are inflated.

The Alfter Patent discloses a sound proofing foam engine lining which is used for the purpose of insulating the noise from the engine so that it does not emanate and make a loud noise against the hood of the engine. The specific invention relates to a closed cell polyethylene material which is used to line the interior of the engine hood in order to provide sound insulation. The innovation is to make the sound proofing material more wear resistant by preventing water and other liquids from penetrating the foam and therefore increase the life span of the foam insulation.

The Elson Patent discloses a storage device for a vehicle luggage compartment.

The Faiciani Patent discloses an expandable protective liner for vehicles. It comprises a floor portion, a pair of opposing sidewall portions, a tail gate portion, and a seat back portion. The pair of opposing sidewall portions are expandable.

The VanHoose Patent discloses an apparatus for protecting a vehicle cargo area. It is a liner which includes a floor portion, a back seat portion, left and right sides and a rear portion.

The Smyl Patent discloses a protective liner insert for a vehicle cargo compartment. The insert comprises sections held tightly together by latches to from a durable protective barrier lining the cargo area to reduce damage by cargo.

The '155 PCT Patent discloses an automotive trunk liner. The liner has a spare tire well recessed in a medial floor area of the compartment. The trunk liner is formed of fibrous material and molded to form a relatively stiff body having a center floor cover panel and a plurality of panels extending upwardly along the side of the center floor cover panel. There is also a cover.

The '794 PCT Patent discloses a vehicle cargo compartment liner.

There is therefore a significant need to have a device which provides a shield from the contents of the interior of the storage compartment of a vehicle so that the interior or exterior of the lid covering storage compartment is protected from objects contained within the storage compartment.

SUMMARY OF THE INVENTION

The concept of the present invention focuses on automobiles, more particularly, Porsches where there is no protection for the underside of the lid which acts as the trunk so that objects that are inside the compartment potentially could bang against the interior of the lid and create dents or damage that can be seen from the outside.

More particularly, the invention relates to a Porsche which is both a mid engine vehicle and a rear engine vehicle where the front of the vehicle beneath the lid is used as a trunk for retaining objects. The lid itself is made of metal and does not have any interior lining for protection.

The concept of the present invention is to create a form-fitted interior shield made of lightweight but strong ABS plastic which is conformed to be removably held in place on the underside of the lid so that it provides a shield so that objects that are placed within the compartment cannot hit up against the interior of the lid and possibly cause an interior dent which can also be seen from the outside.

In summary, the invention can encompass any type of interior shield that is located immediately underneath the lid of the trunk of a vehicle to prevent interior objects from damaging the lid. The present invention is focused on all models of Porsches.

It has been discovered according to the present invention that if a form fitted interior shield is placed within the lid of the trunk which serves as the storage compartment of a vehicle, then the form fitted interior shield which is designed to be removably affixed to the interior of the lid of the trunk of the vehicle serves as a protector to prevent objects contained within the lid of the trunk of the vehicle from making contact with the interior of the lid, especially when the lid is closed with the objects contained beneath them. As a result, dents which can be created by the interior objects are avoided.

It has been additionally discovered according to the present invention, that the interior shield can be made of any strong lightweight material such as ABS plastic.

It has been additionally discovered according to the present invention, that the interior shield can be removably affixed to the interior of the lid of the trunk by means such as plastic or nylon clips which removably affix the shield to the interior underside of the lid of the trunk.

It is an object of the present invention to provide an interior shield on the storage compartment lid of a vehicle so that the shield will prevent objects contained within the storage compartment from making contact with the interior of the lid of the trunk and thereby create an impression which can be seen from the outside.

It is another object of the present invention to create a means for removably affixing the interior shield to the interior of the lid of the trunk of a vehicle so that in the event of an accident or any other necessity to repair the lid of the trunk, the interior shield can be removed and thereafter reaffixed.

It is another object of the present invention to provide a strong but lightweight (up to 3 pounds) material to serve as a shield or guard so that it does not add significant weight to the lid of the trunk so that the lid of the trunk can still be easily opened and closed but at the same time provide a shield or guard means so that objects contained within the trunk will not damage the lid.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
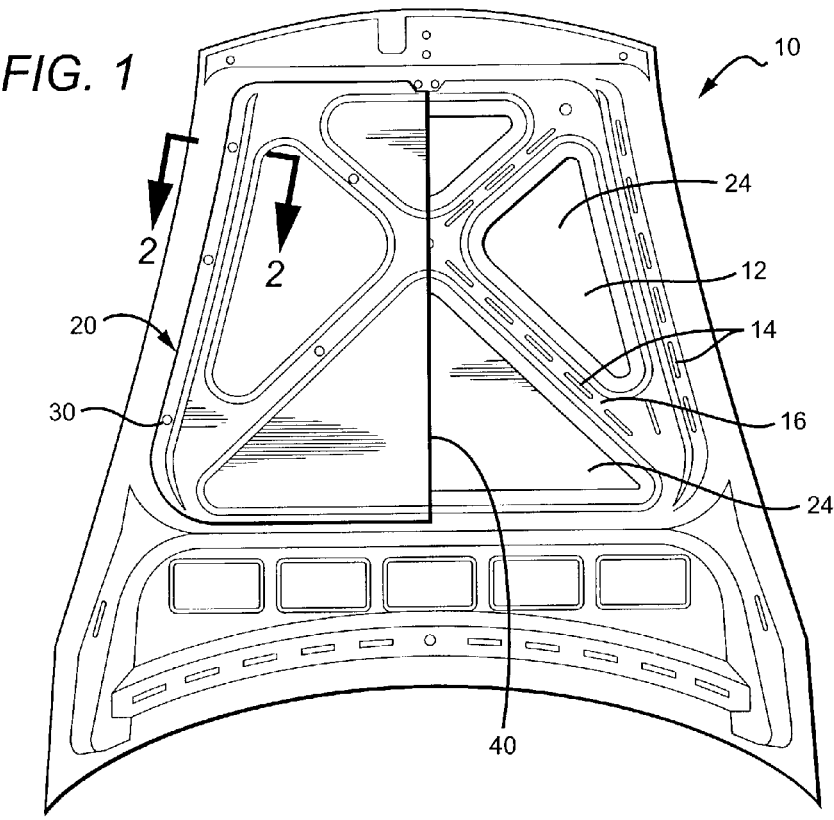
FIG. 1 is a bottom perspective view of the lid of a trunk of a vehicle showing a portion of the present invention form fitted shield member affixed thereto.
Figure 3:
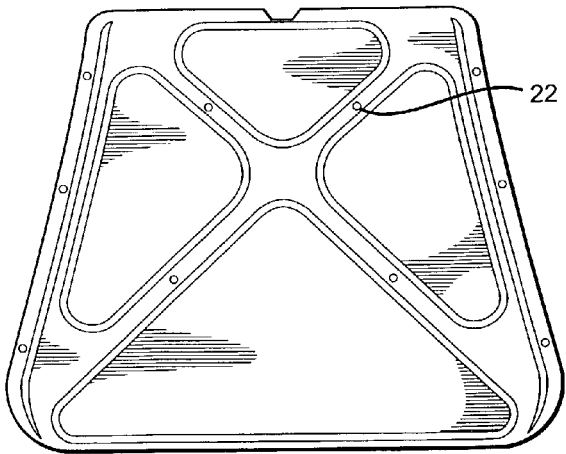
FIG. 3 is a bottom plan view of the present invention form fitted interior shield for a lid of a trunk of a vehicle.

Referring to FIG. 1, there is shown the underside of a lid of the trunk of a vehicle. For purposes of this patent, the trunk of a vehicle is defined as the compartment of the vehicle in which objects are stored. While in most conventional vehicles, the trunk is located in the rear of the vehicle, in some vehicles the trunk is located in the front of the vehicle and in some cases the trunk is located at both the front and the rear of the vehicle. By way of example, the lid illustrated in FIG. 1 is a Porsche 911 where the engine is in the rear of the vehicle and the front part of the vehicle underneath the lid serves as a storage compartment. The lid 10 comprises an interior surface 12 and a multiplicity of openings 14 contained on ribs 16 underneath the lid. The lid has cavities 24 which are adjacent the ribs 16. The lid is usually made of light metal to give it an attractive appearance for the sports car. The one problem with the lid is that because it closes at an angle and is made of light metal, it is easy for the cavities 24 to be damaged by objects which hit the lid. While most prior art inventions are concerned with protecting the exterior of the lid through bras or other guards so that rocks and stones which may hit the lid from the outside while the car is being driven are not caused to damage the exterior of the lid, no concern has ever been made for protecting the interior of the lid from objects that are contained within the storage compartment underneath the lid. In conventional automobiles, while there is a soundproofing lightweight foam barrier that may help muffle the sound of an engine such as disclosed in the Alfter Patent, these do not in any way address protecting against objects that are contained within the storage compartment, such as golf clubs, which can hit up against the underside of the lid when the lid is closed, thereby creating a dent from the underside of the lid which can be seen from the outside. The present invention form fitted interior plastic shield 20 is illustrated in FIG. 3 and is also partially illustrated as being affixed to the underside of the lid in FIG. 1. The present invention interior shield is a form fitted interior shield which is form fitted to the interior of the underside of the lid as is illustrated in FIG. 1, and is precisely matched to the cavities 24 in the lid 10. By being exactly form fitted to the interior of the lid 10, the form fitted shield 20 does not serve to diminish the storage capacity of the storage compartment contained underneath the lid but at the same time serves as a shield to prevent objects contained within the storage compartment from coming into contact with the underside 24 of the lid 10. Objects which abut against the form fitted shield 20 are caused to be either compressed back into the compartment or in turn hit up against the shield. Since there is a distance 40 between the outer skin and where the form fitted shield 20 rests and the interior of the lid caused by the ribs 16, there is no problem with respect to objects hitting against the shield and then the shield itself being pressed against the interior of the lid to avoid damage.

Figure 4:
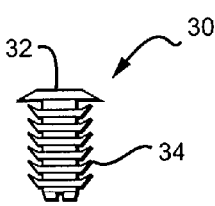
FIG. 4 is a side elevational view of a removable attaching means which is a plastic or nylon clip.

As is illustrated in FIG. 4, the form fitted shield 20 is removably affixed to the interior of the lid of the vehicle by removable attaching means which by way of example, can be a nylon or plastic clip 30 which contains an upper cap 32 and a multiplicity of upwardly extending barbs 34 which serves to removably affix the shield to the lid through existing openings 14 in ribs 16.

Figure 2:
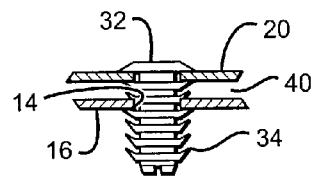
FIG. 2 is a cross-sectional view taken along line 2—2 of FIG. 1, showing the removable attaching means by which the present invention interior form fitted shield is affixed to the underside of the lid of the trunk of a vehicle.

Referring to FIG. 2, the plastic clip 30 is shown in place wherein the upper cap 32 abuts against the surface of the form fitted shield 20 and the multiplicity of barbs 34 serve to retain the form fitted shield 20 by being compressed against the ribs 16 at the location of the openings 14 of the ribs 16.

Referring to FIGS. 1 and 3, the form fitted shield 20 itself contains a multiplicity of openings 22 through which the plastic clip 30 can be inserted. The holes 22 are aligned so that they exactly match the openings 14 in the ribs 16 of the lid 10 so that the plastic clips 30 can perfectly retain the form fitted shield 20 against the underside of the lid 10.

The form fitted shield can be made of any strong lightweight material such as thermoformed or injection molded lightweight material such as thermoformed ABS plastic which by way of example is 0.09 inches thick.

It is emphasized that while the above description has been discussed with a lid, it will be appreciated that the intent of the present invention is to provide a strong lightweight solid form fitted shield to be molded up against the underside of the top of the storage compartment of the vehicle which in the case of the Porsche 911 illustrated in FIG. 1 has a storage compartment in the front part of the vehicle so that the lid covers the storage compartment. It will be appreciated that for more conventional vehicles where the engine is located underneath the hood in the front of the vehicle and the storage compartment is in the trunk in the rear of the vehicle, the same type of form fitted shield can be used for the rear trunk. This will be discussed later on.

FIGS. 1 and 3 relate to a form fitted shield.

Referring to FIGS. 5 through 8, there is illustrated the same view of the underside of the lid of a vehicle where the shield is a flat shield that is designed to be placed within the underside of the lid of the vehicle such as a Porsche 911 but in this case, is not precisely form fitted to the underside of the lid but instead, lies against the underside of the lid with a flat horizontal surface. Specifically, in this case, rather than being precisely form fitted into each of the cavities as discussed in FIGS. 1 and 3, the shield 120 is designed to be affixed to the underside of the lid by the removable attachment means which can be a plastic clip in the manner as illustrated, but instead lies completely flat against the underside of the lid 10 to provide protection.

Figure 5:
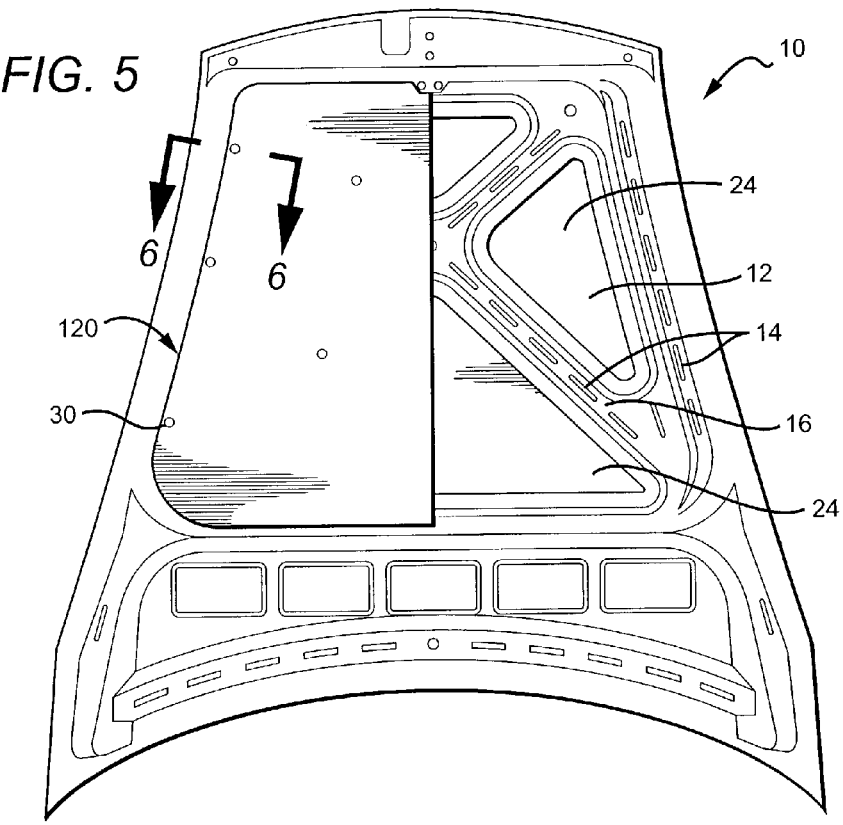
FIG. 5 is a bottom perspective view of the lid of a trunk of a vehicle showing a portion of an alternative embodiment of the present invention shield member affixed thereto.
Figure 7:
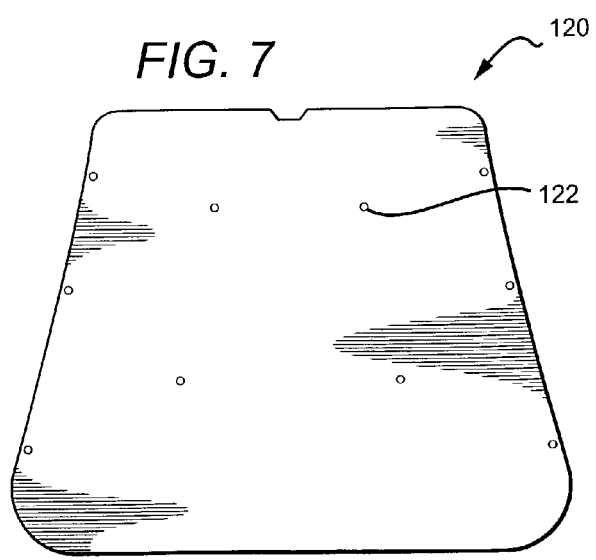
FIG. 7 is a bottom plan view of an alternative embodiment of an interior shield for a lid of a trunk of a vehicle.

Referring to FIG. 5, there is shown the underside of a lid of a trunk of a vehicle. This is the same lid for the trunk illustrated in FIG. 1. To the extent that the parts are identical, the same numbers will be used as referenced in FIGS. 1 through 4. By way of example, the lid illustrated is a Porsche 911 where the engine is in the rear of the vehicle and the front part of the vehicle underneath the lid of the trunk serves as a storage compartment. The lid 10 comprises an interior surface 12 and a multiplicity of openings 14 contained on the ribs 16 underneath the lid. The lid has cavities 24 which are adjacent the ribs 16. The lid is usually made of soft metal to give it an attractive appearance for the sports car. The one problem with the lid is that because it is made of soft metal, it is easy for the lid to be damaged by objects which hit the lid. While most prior art inventions are concerned with protecting the exterior of the lid through bras or other shields so that rocks and stones which may hit the lid from the outside while the car is being driven are not cause to damage the exterior of the lid, no concern has ever been made for protecting the interior of the lid from objects that are contained within the storage compartment underneath the lid. The alternative embodiment of this present invention illustrated specifically in FIG. 7 is a flat interior shield 120. The flat interior shield is also partially illustrated in FIG. 5. The alternative embodiment of the present invention flat interior shield is designed to fit within the space of the underside of the lid as illustrated in FIG. 5. In this case, the flat lid is not precisely matched to the cavities 24 in the lid and instead, lies flat over them. The alternative embodiment is slightly less expensive to manufacture and provides an alternative to the form fitted lid specifically illustrated in FIG. 3. Objects which abut against the shield 120 are caused to be either compressed back into the trunk or in turn hit up against the shield. Since there is a gap 40 between the shield 120 and the interior of the lid caused by the ribs 16, there is no problem with respect to objects hitting against the alternative embodiment flat shield and then the shield itself being pressed against the interior of the lid to avoid damage.

Figure 6:
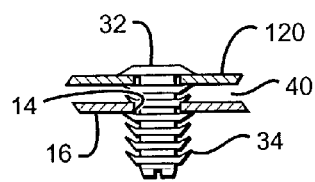
FIG. 6 is a cross-sectional view taken along line 6—6 of FIG. 5, showing the removable attaching means by which the alternative embodiment of the present invention interior shield is affixed to the underside of the lid of the trunk of a vehicle.
Figure 8:
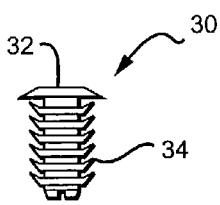
FIG. 8 is a side elevational view of a removable attaching means which is a plastic or nylon clip.

As illustrated in FIGS. 5, 6 and 8, the shield 120 is removably affixed to the interior of the lid of the vehicle by removable attaching means which, by way of example, can be a plastic or nylon clip 30 which contains an upper cap 32 and a multiplicity of upwardly extending barbs 34 which serves to removably affix the shield to the lid. Referring to FIG. 6, the plastic or nylon clip is shown in place wherein the cap 32 abuts against the surface of the flat shield 120 and the multiplicity of barbs 34 serve to retain the shield 120 by being compressed against the ribs 16 at the location of the openings 14 of the ribs 16.

Referring to FIG. 7, the flat shield 120 itself contains a multiplicity of openings 122 through which the plastic clip 30 can be inserted. The holes 122 are aligned so that they exactly match the openings 14 and the ribs 16 of the lid so that the plastic clips 30 can perfectly retain the flat shield 120 against the underside of the lid 10.

The flat shield 120 also is made of strong lightweight material such as thermoformed or injection molded ABS plastic. The flat shield is designed to be lightweight and strong so as to provide protection to the lid from contents contained within the storage compartment.

Referring to FIGS. 9 through 12, there is illustrated a form fitted shield 220 of the present invention which is designed to be accommodated under the lid 210 of the trunk of a vehicle. In this set of figures, there is illustrated a more conventional trunk which is located in the rear of the vehicle. For mid-engine cars, the storage compartment is in both the front and the rear of the vehicle. An example of a lid for the storage compartment in the front of the vehicle has already been illustrated in FIGS. 1 through 8. FIGS. 9 through 12 illustrates the present invention used with the lid where the storage compartment is in the rear of the vehicle. In this case, the Porsche is a mid-engine and the storage compartment of the vehicle is in both front and rear but the rear will be hereafter discussed. However, the same concerns relate to the damage to the lid 210 of the rear trunk of the vehicle from objects that are contained within the rear trunk and in particular, objects that may abut up against the lid 210 such as golf clubs or boxes or packages that are contained within the rear trunk. Once again, there is illustrated a form fitted shield 220 which is designed to be exactly form fitted within the cavities 224 and around the ribs 216 of the lid 210 of the vehicle so that the form fitted shield 220 precisely matches the underside of the lid 210 of the vehicle to provide a shield means.

Once again, items where the numbers are the same which essentially is only the plastic clip will be numbered with the same items and comparable items will be numbered similarly with the number 200 added to it.

Figure 9:
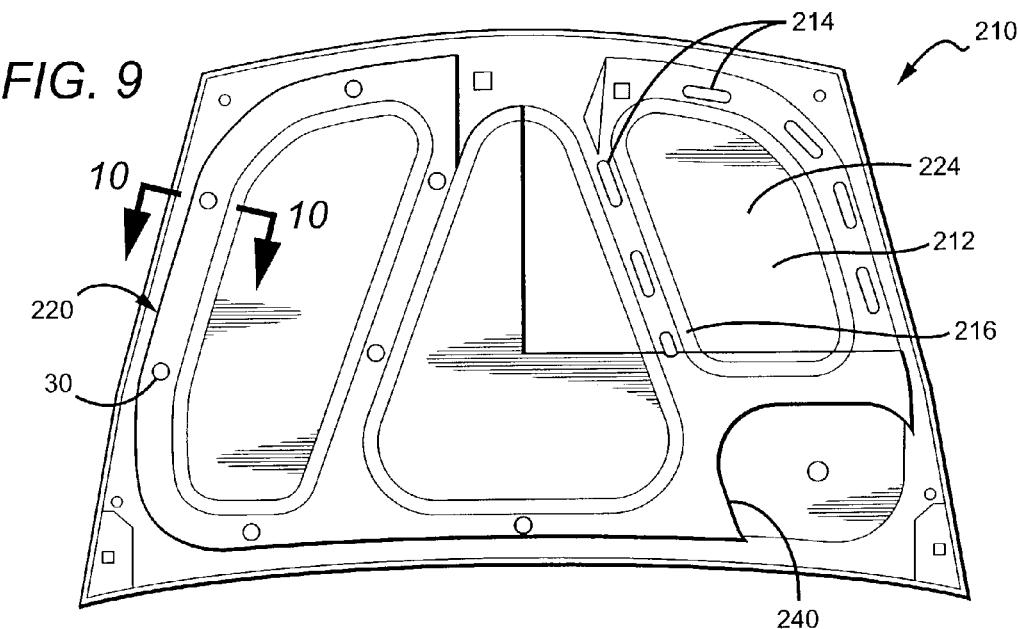
FIG. 9 is a bottom perspective view of the lid of the trunk of a vehicle with the present invention form fitted interior shield member affixed thereto.
Figure 11:
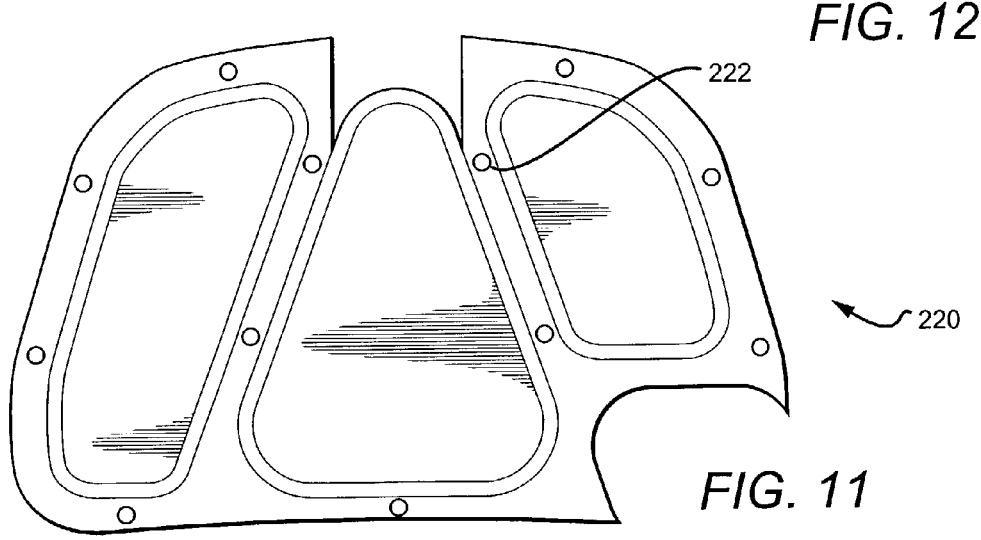
FIG. 11 is a bottom plan view of the present invention form fitted shield for the lid of the trunk of a vehicle.

Referring to FIG. 9 there is shown the underside of a lid 210 of the trunk in the rear of a vehicle. The lid 210 comprises an interior surface 212 and a multiplicity of openings 214 contained on ribs 216 underneath the lid 210. The lid has cavities 224 which are adjacent the ribs 216. The lid is usually made of light metal to give it an attractive appearance. The one problem with the lid is that because it is made of light metal not covered from underneath, it is easy for the lid cavities 224 to be damaged by objects which hit the lid. The present invention form fitted interior shield 220 is illustrated in FIG. 11 and is also partially illustrated as being affixed to the underside of the lid 210 in FIG. 9. The present invention interior shield is a form fitted interior shield which is form fitted to the interior of the underside of the lid as illustrated in FIG. 9, and is precisely matched to the cavities 224 in the lid 210. By being exactly form fitted to the interior of the lid 210, the form fitted shield 220 does not serve to diminish the storage capacity of the storage compartment contained underneath the lid of the trunk, but at the same time serves as a shield to prevent objects contained within the trunk from coming into contact with the underside of the lid 210. Objects which abut against the form fitted shield 220 are caused to be either compressed back into the trunk or in turn, hit up against the shield. Since there is a gap 240 between the form fitted shield 220 and the interior of the lid 210 caused by the ribs 216, there is no problem with respect to objects hitting against the shield and then the shield itself being pressed against the interior of the lid to avoid damage.

Figure 12:
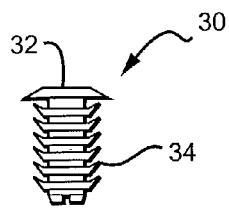
FIG. 12 is a side elevational view of a removable attaching means which is a plastic or nylon clip.

As illustrated in FIGS. 9 and 12, the shield 220 is removably affixed to the interior of the lid of the trunk of the vehicle by removable attaching means which by way of example, can be a plastic clip 30 which contains an upper cap 32 and a multiplicity of upwardly extending barbs 34 which serves to removably affix the shield to the lid.

Figure 10:
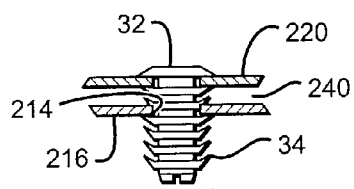
FIG. 10 is a cross-sectional view taken along line 10—10 of FIG. 9, showing the removable attaching means by which the present invention interior form fitted shield is affixed to the underside of the lid of the trunk of a vehicle.

Referring to FIG. 10, the plastic clip is shown in place where the cap 32 abuts against the surface of the form fitted shield 220 and the multiplicity of barbs 34 serve to retain the form fitted shield 220 by being compressed against the ribs 216 at the location of the openings 214 of the ribs 216.

Referring to FIG. 11, the form fitted shield 220 itself contains a multiplicity of openings 222 through which the plastic clip 30 can be inserted. The holes 222 are aligned so that they exactly match the openings 214 and the ribs 216 of the lid 210 so that the plastic clips 30 can perfectly retain the form fitted shield 220 against the underside of the lid 210.

The form fitted shield used with the lid to a trunk also can be made of strong lightweight material such as thermoformed or injection molded ABS plastic, or strong metal material, etc.

Defined in detail, the present invention is a shield for use with the lid of the storage compartment of a vehicle wherein the lid has an interior surface with a multiplicity of ribs extending interiorly from the interior surface to form a multiplicity of cavities, the ribs having a multiplicity of spaced apart opening, the shield comprising: (a) a form fitted piece of material formed to fit over the multiplicity of ribs and conforming to the shape of the multiplicity of cavities, the shield having a multiplicity of openings which are respectively aligned with several of the multiplicity of openings in the ribs; and (b) retaining means respectively inserted through the aligned openings in the shield and the ribs to removably retain the shield on the ribs to protect the lid.

Defined broadly, the present invention is a shield for use with the lid of the storage compartment of a vehicle wherein the lid has an interior surface with a multiplicity of ribs extending interiorly from the interior surface, the ribs having a multiplicity of spaced apart openings, the shield comprising: (a) a generally flat piece of material formed to fit over the multiplicity of ribs, the shield having a multiplicity of openings which are respectively aligned with several of the multiplicity of openings in the ribs; and (b) retaining means respectively inserted through the aligned openings in the shield and the ribs to removably retain the shield on the ribs to protect the lid.

Defined alternatively, the present invention is a shield for use with the lid of the storage compartment of a vehicle wherein the lid has an interior surface, the shield comprising: (a) a form fitted piece of material formed to fit the shape of the interior surface of the lid; and (b) means to removably affix the shield over the interior surface of the lid.

Defined alternatively in detail, the present invention is a shield for use with the lid of the storage compartment of a vehicle wherein the lid has an interior surface, the shield comprising: (a) a generally flat piece of material formed to fit over the interior surface of the lid; and (b) means to removably affix the shield over the interior surface of the lid.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A shield for use with the lid of the storage compartment of a vehicle wherein the lid has an interior surface with a multiplicity of ribs extending interiorly from the interior surface to form a multiplicity of cavities, the ribs having a multiplicity of spaced apart openings, the shield comprising:

a. a form fitted piece of material made from thermoformed ABS plastic, formed to fit over said multiplicity of ribs and conforming to the shape of said multiplicity of cavities, the shield having a multiplicity of openings which are respectively aligned with several of the multiplicity of openings in said ribs;
b. the form fitted piece of material made of thermoformed ABS plastic is of sufficient strength to prevent objects contained within the storage compartment from damaging the lid by providing a shield and barrier between the contents of the storage compartment and the lid; and
c. retaining means respectively inserted through said aligned openings in said shield and said ribs to removably retain the shield on said ribs to protect the lid.

2. The shield as defined in claim 1 wherein said storage compartment is in the rear of the vehicle and is the trunk, and said lid is the hood of the trunk.

3. The shield as defined in claim 1 wherein said storage compartment is in the front of the vehicle and the lid is the front hood of the vehicle.

4. The shield as defined in claim 1 wherein said retaining means is a clip having an upper cap and a multiplicity of barbs wherein the cap abuts against the surface of the shield and the barb serves to retain the shield by being compressed against the ribs at the location of the aligned openings.

5. The shield as defined in claim 4 wherein said clip is made of plastic.

6. The shield as defined in claim 4 wherein said clip is made of nylon.

7. A shield for use with the lid of the storage compartment of a vehicle wherein the lid has an interior surface with a multiplicity of ribs extending interiorly from the interior surface to form a multiplicity of cavities, the ribs having a multiplicity of spaced apart openings, the shield comprising:
a. a form fitted piece of material made from injection molded plastic, formed to fit over said multiplicity of ribs and conforming to the shape of said multiplicity of cavities, the shield having a multiplicity of openings which are respectively aligned with several of the multiplicity of openings in said ribs;
b. the form fitted piece of material made of injection molded plastic is of sufficient strength to prevent objects contained within the storage compartment from damaging the lid by providing a shield and barrier between the contents of the storage compartment and the lid; and
c. retaining means respectively inserted through said aligned openings in said shield and said ribs to removably retain the shield on said ribs to protect the lid.

8. The shield as defined in claim 7 wherein said storage compartment is in the rear of the vehicle and is the trunk, and said lid is the hood of the trunk.

9. The shield as defined in claim 7 wherein said storage compartment is in the front of the vehicle and the lid is the front hood of the vehicle.

10. The shield as defined in claim 7 wherein said retaining means is a clip having an upper cap and a multiplicity of barbs wherein the cap abuts against the surface of the shield and the barb serves to retain the shield by being compressed against the ribs at the location of the aligned openings.

11. The shield as defined in claim 10 wherein said clip is made of plastic.

12. The shield as defined in claim 10 wherein said clip is made of nylon.

13. A shield for use with the lid of the storage compartment of a vehicle wherein the lid has an interior surface with a multiplicity of ribs extending interiorly from the interior surface, the ribs having a multiplicity of spaced apart openings, the shield comprising:
a. a generally flat piece of material made of thermoformed ABS plastic, formed to fit over said multiplicity of ribs, the shield having a multiplicity of openings which are respectively aligned with several of the multiplicity of openings in said ribs;
b. the form fitted piece of material made of thermoformed ABS plastic is of sufficient strength to prevent objects contained within the storage compartment from damaging the lid by providing a shield and barrier between the contents of the storage compartment and the lid; and
c. retaining means respectively inserted through said aligned openings in said shield and said ribs to removably retain the shield on said ribs to protect the lid.

14. The shield as defined in claim 13 wherein said storage compartment is in the rear of the vehicle and is the trunk, and said lid is the hood of the trunk.

15. The shield as defined in claim 13 wherein said storage compartment is in the front of the vehicle and the lid is the front hood of the vehicle.

16. The shield as defined in claim 13 wherein said retaining means is a clip having an upper cap and a multiplicity of barbs wherein the cap abuts against the surface of the shield and the barb serves to retain the shield by being compressed against the ribs at the location of the aligned openings.

17. The shield as defined in claim 16 wherein said clip is made of plastic.

18. The shield as defined in claim 16 wherein said clip is made of nylon.

19. A shield for use with the lid of the storage compartment of a vehicle wherein the lid has an interior surface with a multiplicity of ribs extending interiorly from the interior surface, the ribs having a multiplicity of spaced apart openings, the shield comprising:
a. a generally flat piece of material made of injection molded plastic, formed to fit over said multiplicity of ribs, the shield having a multiplicity of openings which are respectively aligned with several of the multiplicity of openings in said ribs;
b. the form fitted piece of material made of injection molded plastic is of sufficient strength to prevent objects contained within the storage compartment from damaging the lid by providing a shield and barrier between the contents of the storage compartment and the lid; and
c. retaining means respectively inserted through said aligned openings in said shield and said ribs to removably retain the shield on said ribs to protect the lid.

20. The shield as defined in claim 19 wherein said storage compartment is in the rear of the vehicle and is the trunk, and said lid is the hood of the trunk.

21. The shield as defined in claim 19 wherein said storage compartment is in the front of the vehicle and the lid is the front hood of the vehicle.

22. The shield as defined in claim 19 wherein said retaining means is a clip having an upper cap and a multiplicity of barbs wherein the cap abuts against the surface of the shield and the barb serves to retain the shield by being compressed against the ribs at the location of the aligned openings.

23. The shield as defined in claim 22 wherein said clip is made of plastic.

24. The shield as defined in claim 22 wherein said clip is made of nylon.

* * * * *